United States Patent [19]

Krstic

[11] Patent Number: 5,166,103

[45] Date of Patent: Nov. 24, 1992

[54] METHOD OF MAKING MONOTUNSTEN CARBIDE AND MIXTURES OF MONOTUNGSTEN CARBIDE-TITANIUM CARBIDE POWDERS

[76] Inventor: Vladimir Krstic, 7 Lochinvar Road, Kingston, Ontario, Canada, K7M 6R9

[21] Appl. No.: 744,397

[22] Filed: Aug. 13, 1991

[51] Int. Cl.$^5$ .................... C04B 35/56; C01B 31/30; C01B 31/34; C09C 1/68
[52] U.S. Cl. ........................................ 501/87; 51/307; 423/440
[58] Field of Search .................. 423/439, 440; 501/87, 501/93; 51/307

[56] References Cited

U.S. PATENT DOCUMENTS

| | | | |
|---|---|---|---|
| 2,800,393 | 7/1957 | Mettler | 423/440 |
| 3,892,644 | 7/1975 | Borg et al. | 423/440 |
| 4,008,090 | 2/1977 | Miyake et al. | 423/440 |
| 4,664,899 | 5/1987 | Kimmel et al. | 423/440 |

FOREIGN PATENT DOCUMENTS

| | | | |
|---|---|---|---|
| 547038 | 10/1957 | Canada | 423/440 |
| 811906 | 4/1959 | United Kingdom | 423/440 |

*Primary Examiner*—Gary P. Straub
*Assistant Examiner*—Stephen G. Kalinchak

[57] ABSTRACT

A process for production of high surface area, submicron size, monotungsten carbide and mixtures of monotungsten carbide-titanium carbide by reacting a mixture of tungsten oxide (or APT), titanium oxide and carbon powders in a mixing reactor. When the temperature in the reactor reaches reaction temperature a vacuum is applied. The charge is kept under a high vacuum until the reaction is complete, and is agitated to enhance the release of carbon monoxide. The products typically contain in excess of 99% carbides, have a surface area greater than 4.2 m$^2$/g for mixture at monotungsten carbide and titanium carbide, and an average particle size between 0.2 and 0.5 microns.

10 Claims, No Drawings

METHOD OF MAKING MONOTUNSTEN CARBIDE AND MIXTURES OF MONOTUNGSTEN CARBIDE-TITANIUM CARBIDE POWDERS

FIELD OF INVENTION

The invention is directed to the production of monotungsten carbide and mixtures-solid solutions between monotungsten carbide and titanium carbide in powder form. More specifically, this invention is directed to the production of tungsten carbide and mixtures of tungsten carbide and titanium carbide powders using paratungstate or oxides as starting material by direct carburizing process.

BACKGROUND OF THE INVENTION

There are two forms of tungsten carbide. Monotungsten carbide has the formula WC, and di-tungsten carbide has the formula $W_2C$. Of the two, WC has much greater commercial value and is used for the manufacture of various cemented carbide tools and structural components.

In the past, tungsten monocarbide powders have been produced mainly by two routes, the direct carburization process and the alumino thermit process (also known as the Macro Process).

In alumina thermit process, described in P. C. McKenna. U.S. Pat. No. 3,379,503 the mixture of tungsten ore concentrates and iron oxide are reduced by aluminum metal and simultaneously carburized by the use of carbon source such as calcium carbide and carbon. The reactants were added such that they can develop a self-sustaining exothermic reaction at a calculated temperature of about 2445° C. In order to minimize the amount of undesirable carbide phases such as $W_2C$ and the compounds of the type $M_3 W_3C$, the process temperature must be kept in the range between 2482° C. and 412° C. To maintain the temperature within this range, it was found necessary to blend high grade tungsten ore concentrates with low grade tungsten ore concentrates which normally contain excessive amounts of Ti. Nb and Ta as impurities.

An improved version of the aluminothermit method of producing tungsten monocarbide powders is described in detail in U.S. Pat. No. 4.834.963. In this process, metallic iron is added to the reaction charge in quantities to control the calculated reaction temperature within the range of about 2411° C. to about 2482° C. Furthermore, it was found that this process can be controlled to produce macrocrystalline tungsten carbide powders with very low content of Ti, Ta and Nb and a narrow range of total carbon content.

The direct carburization process involves subjecting tungsten metal. tungstic acid, ammonium paratungstate or tungsten oxide powder to carburization with finally divided carbon at about 1400 to 1700 degrees centigrade Canadian patent No. 4,664,899 describes the production of WC from ammonium paratungstate (APT). The APT is first calcined at temperatures between 540° and 620° C. to produce blue tungsten oxide, which is then placed in molybdenum boats and reduced in dry hydrogen at 700° to 900° C. to form tungsten metal powder. The metal powder is then blended with carbon black and carburized at 1500° C. in a graphite crucible. In another process described in the paper published by M. Miyake, A. Hara and T. Sho, "The Direct Production of WC from $WO_3$ by using Two Rotary Carburizing Furnaces" in the Journal of Japan Society of Powder and Powder Metallurgy, Vol., 26. pp. 90, 1979, and carbon mix is pelletized and reacted in a series of two rotary furnaces The first furnace operates in nitrogen and allows the formation of a mixture $W-W_2C-WC-C$. The material is then fed directly into a second rotary furnace operating in $H_2$ for final carburization at a higher temperature In addition to the problems associated with higher capital investments due to the use of two furnaces the process requires the strict control of the $CO-CO_2$ partial pressure ratio.

A more recent method of producing WC from either $WO_3$ or APT and carbon source is described in U.S. Pat. No. 4,664,899. The process consists of two steps. In the first step, $WO_3$ (or APT) and a substoichiometric amount of carbon are mixed in either a mixer or a ball mill. The mixture is loaded in graphite boats and carburized in a nonreducing atmosphere. This results in a partially carburized mixture depleted of carbon near the powder bed surface (rich in W) and rich in WC and $W_2C$ in the center of the bed. In the second step, the partially carburized mixture is removed from the furnace, sampled, and an appropriate amount of carbon powder is added. After blending, the mixture was carburized in a reducing atmosphere which is preferably hydrogen.

In the above cited processes involving the direct reduction of $WO_3$ or APT to WC two major problems can be identified. First the tungsten carbide particle size is difficult to control due to water vapour deposition due to hydrogen which occurs in the carburizing powder bed. Also, to produce fine tungsten carbide powder, high hydrogen flow rates are required. Second, the complexity of the direct reduction and carburization reactions makes utilization of large boat loads very difficult. This is further aggravated by the low thermal conductivity of the powder bed in the furnace, which produces large thermal gradients between the center and the outer surfaces. This results in the center of the powder bed reacting at a later time. The $CO_2$ gas liberated from the central portion of the bed must pass through the bed surface allowing the following reaction to occur.

$$CO_2 + C \rightarrow 2CO$$

which leads to carbon depletion from the outer portions of the powder bed. This results in a center core in the powder bed containing high percentages of carbide (WC and $W_2C$), while the top surface of the bed contains primarily W and $W_2C$. Due to this the maximum output did not exceed 1.2-2.0 kg/h per furnace tube.

Evidently, the reduction of both $WO_3$ and $TiO_2$ to metals is controlled by the partial pressure of CO and $CO_2$.

SUMMARY OF THE INVENTION

The present invention relates to the production of fine WC and the mixtures of WC-TiC powders by direct reduction of tungsten and titanium precursors with carbon in one temperature cycle employing simultaneously a high vacuum and agitation.

The major objects of the invention are to
(i) eliminate the use of hydrogen, thereby eliminate W particle growth assisted by the water vapour deposition reaction,
(ii) to eliminate the need for two separate steps involving reduction and carburization and (iii) to decrease the processing time.

Constant mixing by means of bed rotation employed in the present invention, provides good homogenization which, when combined with high vacuum, provide the condition for a substantial reduction in reaction time required for the formation of the carbides. The process thus provides condition for a large scale commercial production of submicron size and high surface area W and WC-TiC powders.

In accordance with the present invention, there is provided a process for producing tungsten carbide and tungsten-titanium carbide comprising mixing tungsten oxide (or APT) with powder carbon or mixing tungsten oxide (or APT) and titanium oxide with powder carbon to form resulting mixtures, reducing the resulting mixtures while mixing the mixtures by means of rotation of a pelletized bed under reduced pressure of up to 50 millitorrs in a rotary furnace, to produce tungsten monocarbide and tungsten carbide-titanium carbide solid solution at temperatures below 1400° C. and reaction times of less than 40 min.

DETAILED DESCRIPTION

The formation of tungsten carbide, using $WO_3$ as raw material, involves the following possible reactions:

$$WO_3 + C \rightarrow WO_2 + CO \qquad (1)$$

$$WO_2 + 2C \rightarrow W + 2CO \qquad (2)$$

$$W + C \rightarrow WC \qquad (3)$$

$$W + 2CO \rightarrow WC + CO_2 \qquad (3)$$

or $$WO_3 + 4C \rightarrow WC + 3CO \qquad (5)$$

It is believed that the formation of tungsten carbide from $WO_3$ proceeds in the following order:

$$WO_3 \rightarrow WO_2 \rightarrow W \rightarrow W_2C \rightarrow WC$$

the latter two are controlled the diffusion of C into the W.

Similarly for titanium carbide:

$$TiO_2 + C \rightarrow TiO + CO \qquad (6)$$

$$TiO + C \rightarrow Ti + \qquad (7)$$

$$Ti + C \rightarrow TiC \qquad (8)$$

or $$TiO_2 + 3C \rightarrow TiC + 2CO \qquad (9)$$

The processing steps of the invention are:
a) Mixing of tungsten oxide or APT as a source of tungsten with powdered carbon source, or mixing tungsten oxide (or APT) and titanium oxide with powdered carbon source in a substoichiometric molar ratios.
b) Reducing the mixture in a rotary furnace under argon or CO pressure of at least 10 psi above atmospheric pressure or under subatmospheric pressure at temperatures of 900° to 1600° C.
c) Holding the mixture at required temperature under vacuum for different times ranging from 30 min to several hours to produce monotungsten carbide or mixture (in the form of a solid solution) of tungsten carbide and titanium carbide.

In process step (a). sufficient carbon is added to ensure complete reduction of all oxides and carburization of metals. Powder mixing and their pelletizing is preferably done in an Eirich Mixer in order to produce pellets in the range 1 to 5 mm. Mixing time should be sufficient to produce a uniform blend, i.e. generally 1 to 6 hours.

Step (b) is basically to reduce the oxides and provide a complete carburization of tungsten and titanium. Temperatures in excess of 900° C. are necessary for the reduction of oxides. The time and temperature required for the completion of the reaction depends on the partial pressure of CO and $CO_2$. Simultaneous rotation of the pelletized bed and high vacuum were found to greatly reduce the reaction time. In the present invention, the time required for a complete conversion of tungsten and titanium oxide into carbides was found to be as low as 40 min. The added advantage of a continuous bed rotation is that it provides a useful means by which a tight control of carbon and oxygen can be maintained. The intense mixing of the pelletized bed by means of agitation, eliminates entirely the limits imposed on the bed thickness and provides the means by which a large scale industrial production of WC and WC-TiC powders can be accomplished. Contrary to other known processes, the present process does not require the use of nitrogen, or hydrogen gas.

A resistant graphite furnace such as, for example, a rotary tube furnace was found to be particularly suitable for this process although any other furnace which can withstand process conditions may be used.

In order to avoid excessive loss of reactant components from the system, and in particular to avoid depletion of carbon component from the surface of tungsten and titanium carbide particle surface formed in the early stages of reaction, the system is pressurized with nonreactive gas such as carbon monoxide argon etc. and maintained until the reaction temperature has been reached. It was discovered that a pressure of 0.136 MPa (20 psig) above atmospheric is sufficient to limit the loss of carbon and thus to limit the decarburization of tungsten carbide.

Above about 1400° C., kinetically, the rate of tungsten carbide formation is relatively high and a vacuum is applied to the reaction chamber in order to promote removal of carbon monoxide and to enhance the reaction rate of tungsten and titanium carbide formation. The system was evacuated until the pressure was less than 1000 millitorrs. Simultaneously with the application of vacuum, the bed of the homogeneous reactant mix was turned to agitate the reactants and to promote free passage of the reaction inhibiting carbon monoxide gas. Application of vacuum, simultaneously with turning or agitation for an initially homogeneous mix, employed for the first time in this invention, was found to be essential for the production of large quantities of high and reproducible quality tungsten carbide powders. Furthermore, the combination of high vacuum and continuous bed mixing provides the condition for shortening the reaction time and lowering the reaction temperature. The reaction time is directly related to:
(a) reaction temperature
(b) reactant particle size
(c) the level of vacuum applied, and
(d) the rate of bed agitation.

After the reaction of tungsten and titanium carbide formation was complete, the powder was discharged from the furnace. The free carbon content and the oxygen level of the powder obtained depend on the $C/WO_3$ and $C/TiO_2$ molar ratio in the original homogeneous mix, the reaction temperature and time, the level of vacuum, and the mixing condition. The free (unreacted) carbon content typically ranges from 0.04 to 0.1 wt% and the oxygen level does not exceed 0 1 wt%. Preferably, the reduced pressure is varied from about 30 millitorrs to about 1000 millitorrs absolute pressure. However, absolute pressure higher than 1000 millitorrs can be used but this will increase the reaction time and reduced the reactant bed thickness. The powder mixture is heated under vacuum and rotation of approximately 1-10 rpm to a temperature falling within a range of about 1200° C. to ~2000° C., preferably between 1400° C. and 1450° C. The rate of heating is kept in the range of 10° to 50° C/min, although higher rates may be used.

Production of WC and mixtures of TiC-WC powders directly from oxides in one temperature cycle under vacuum and agitation, the "in situ" produced metal through reactions (2) and (7) are of very high surface area and thus of very high reactivity with carbon which is prerequisite for fast carburization reaction (reactions (3) and (8)). The additional advantage of this process is that metal powders produced by the reactions (2) and (7) are not exposed to air but constantly subjected to a high vacuum which eliminates entirely their tendency for oxidation. The WC and TiC-WC mixtures produced by the present invention are thus of submicron size and with oxygen content of less than 0.10 wt%.

The process and products of this invention are explained in detail in the following examples which are illustrative only. Those skilled in the art will recognize that there are numerous modifications and variations and that the present invention is not limited to such examples.

EXAMPLE 1

838 grams of $WO_3$ with an initial surface area of 14.7 $m^2/g$ and lost on ignition (LOI) of 3.5 wt% at 950° C., was mixed with 164 gr of carbon black with an initial surface area of 8 $m^2/g$. The mixing and pelletizing were performed in an Eirich Mixer for 2 hours. The mixture was loaded into a 15.24 cm diameter graphite retort and placed in a graphite resistance furnace possessing a variable speed-rotation mechanism. The furnace was then heated up to 1400° C. under 1 atm absolute pressure of argon without rotation. Upon reacting at the desired temperature, the mixture (in the form of pellets) was held for one hour, furnace cooled to room temperature. and then removed from the furnace. X-ray diffraction showed this powder to have a minimum of 11 wt% $W_2C$ phase and at least 2 wt% W. The measured carbon total was 7.06 wt% and measured free carbon was a minimum 1.4 wt%.

EXAMPLE 2

838 grams of $WO_3$ and 164 grams of carbon black, was mixed and pelletized in an Eirich Mixer for 2 hours. The mixture was loaded into a 15.24 cm diameter graphite retort and heated up to 1400° C. with rotation of 1 rpm and a carbon monoxide pressure of one atmosphere absolute. Upon reacting 1400° C., the mixture was held for one hour, then furnace cooled to room temperature and removed from the furnace.

X-ray diffraction showed this powder to contain 8 5 wt% $W_2C$ and no detectable amount of W. The measured carbon total was 7.00 wt% and the measured free carbon was minimum 1.13 wt%. The measured surface area of the powder was 1.8 $m^2/g$.

EXAMPLE 3

838 grams of $WO_3$ and 164 grams of carbon black were mixed and pelletized as per Example 1. The mixture was loaded into 15.24 cm giameter graphite retort and heated up to 1400° C., the mixture was held until the vacuum of 100 millitorrs was reached. At this moment the furnace was shut off and the sample was cooled to room temperature and then removed from the furnace.

X-ray diffraction showed this powder to contain 12 wt% $W_2C$ and no detectable amount of W. The measured carbon total was 6.98 wt%. and the measured free carbon was minimum 1.1 wt%.

EXAMPLE 4

838 grams of $WO_3$ and 164 grams of carbon black were mixed and pelletized as per Example 1. The mixture was loaded into a 15.24 cm diameter graphite retort and heated up to 1400° C. with the rate of heating of 50° C./min under full vacuum and rotation of 1 rpm. Upon reaching 1400° C., the mixture was held at 1400° C. for approx. 40 minutes during which time subatmospheric pressure (vacuum) of 100 millitorrs was reached. The sample was furnace cooled to room temperature and then removed from the furnace X-ray diffraction showed this powder to contain only WC with no detectable amount of $WO_3$, $W_2C$ or W. The measured carbon total was 6.90 wt% and the measured free carbon was 0.1 wt%. The measured surface area of the powder was 1.44 $m^2/g$ and the average particle size was 0.2-0.5 $\mu m$. The measured oxygen content was 0.1 wt%.

EXAMPLE 5

385 grams of $WO_3$, 451 grams of $TiO_2$ and 264 grams of carbon black were mixed as per Example 1. The mixture was loaded into a 15.24 cm diameter graphite retort and heated up to 1450° C., with the rate of heating of 50° C./min under full vacuum and rotation of 1 rpm. Upon reaching 1450° C., the mixture was held at 1450° C. for approximately 40 minutes during which time the subatmospheric pressure (vacuum) of 100 mtorrs was reached. The sample was furnace cooled to room temperature and then removed from the furnace.

X-ray diffraction showed this powder to contain only WC-TiC with no detectable amount of $W_2C$, $WO_3$ or $TiO_2$. The measured carbon total was 13 wt% and the measured free carbon was 0.35 wt%. The measured surface area of the powder was 4.2 $m^2/g$ and the average particle size was 0.2-0 5 $\mu m$.

It should be noted that the process as described above is a preferred embodiment of the invention and the values given for temperatures, surface area, particle size, pressures and mix composition are those desired to produce tungsten carbide and tungsten carbide-titanium carbide mixtures of high purity and high surface area at an increased reaction rate. However, where coarser tungsten carbide and tungsten carbide-titanium carbide powders are acceptable or required, coarser starting material can be used together with higher reaction temperatures and longer reaction times. Also, mixing of the reactions by means of rotation is preferred but not the only way of mixing. Spraying, milling with various milling media and other ways mixing can also be employed.

I claim:

1. A method of making monotungsten carbide or mixtures of monotungsten carbide-titanium carbide powders without the use of hydrogen or nitrogen, comprising mixing as reactants tungsten oxide or ammonium paratungstate with carbon powder when producing monotungsten carbide, or titanium oxide and tungsten oxide or ammonium paratungstate with carbon when producing monotungsten carbide-titanium carbide mixtures comprising the steps of: (i) heating the reactants in a reaction chamber under a non-reactive gas pressure until the reactants reach a temperature of between 900 and 2000 degrees C wherein the pressure is maintained at a level to sufficient to prevent the substantial los of carbon from the reactants; (ii) subsequently maintaining the temperature of the reactants between 900 and 2000 degrees C. to force the reactants to react producing carbon monoxide as a by product, and simultaneously applying a subatmospheric pressure to the reactants which is in the range from about 5 millitorr to about 2000 millitorr which pressure is sufficient to remove carbon monoxide from the reaction chamber, whereby the removal of the carbon monoxide drives the reaction to substantial completion.

2. A method as claimed in claim 1, wherein each of the carbon, tungsten oxide, titanium oxide and ammonium paratungstate powders has a surface area above 2 $m^2/g$.

3. A method as claimed in claim 2, wherein the carbon powder is submicron size and surface area of 8 $m^2/g$ and tungsten oxide has a surface area of 14.7 $m^2/g$.

4. A method as claimed in claim 1, wherein the nonreactive gas comprises an inert gas.

5. A method as claimed in any one of claims 1 and 4, wherein the pressure of the non-reactive gas is at least 0.034 MPa above atmospheric pressure.

6. A method as claimed in any one of claims 2, 3 and 4 wherein the carbon and oxide powder mixture is either continuously or intermittently agitated, and agitation is carried out during at least the step of maintaining the temperature whilst applying a subatmospheric pressure.

7. A method as claimed in any one of claims 2, 3 and 4 wherein the reactants are agitated by rotating the reaction chamber.

8. A method as claimed in any one of claims 2, 3 and 4 which is carried out in a reaction chamber formed from graphite, tungsten carbide, titanium carbide or molybdenum capable of providing high vacuum and continuous mechanical mixing/agitation of the reactants.

9. A method as claimed in any one of claims 1, 2 and 4 in which the subatmospheric pressure within the reaction chamber and/or rate of gas production from the reactants is monitored, to determine when the reaction has been driven to substantial completion.

10. A method of making submicron size tungsten carbide or a submicron size mixture of tungsten carbide and titanium carbide without the use of hydrogen or nitrogen, the method comprising the steps of: (i) mixing, as reactants, a submicron size carbon powder with tungsten oxide, ammonium paratungstate or any other tungsten containing compounds having a surface area above 2 $m^2/g$ when producing tungsten carbide, or mixing, as reactants, a submicron size carbon powder with tungsten oxide and titanium oxide when producing mixtures of tungsten carbide and titanium carbide wherein said oxides have a surface area above 2 $m^2/g$; (ii) continuously heating the reactants in a reaction chamber under a non-reactive gas pressure of carbon monoxide which is equal to or greater than atmospheric pressure until the reactants reach a temperature between 900–2000 degrees C. whilst maintaining the partial pressure of the carbon monoxide at a level sufficient to prevent substantial loss of carbon from the reactants and (iii) subsequently maintaining the temperature of the reactants between 900–2000 degrees C. to cause the reactants to form tungsten carbide or a tungsten carbide-titanium carbide mixture and carbon monoxide, whilst applying a subatmospheric pressure to the reactants in the reaction chamber in the range of 5–2000 millitorrs which is sufficient to remove carbon monoxide gas from the reaction chamber and to drive the reaction to substantial completion and agitating the reactants to prevent any pressure differential of carbon monoxide developing within the reactants which would inhibit the reaction and promote heat transfer to the reactants.

* * * * *